UNITED STATES PATENT OFFICE.

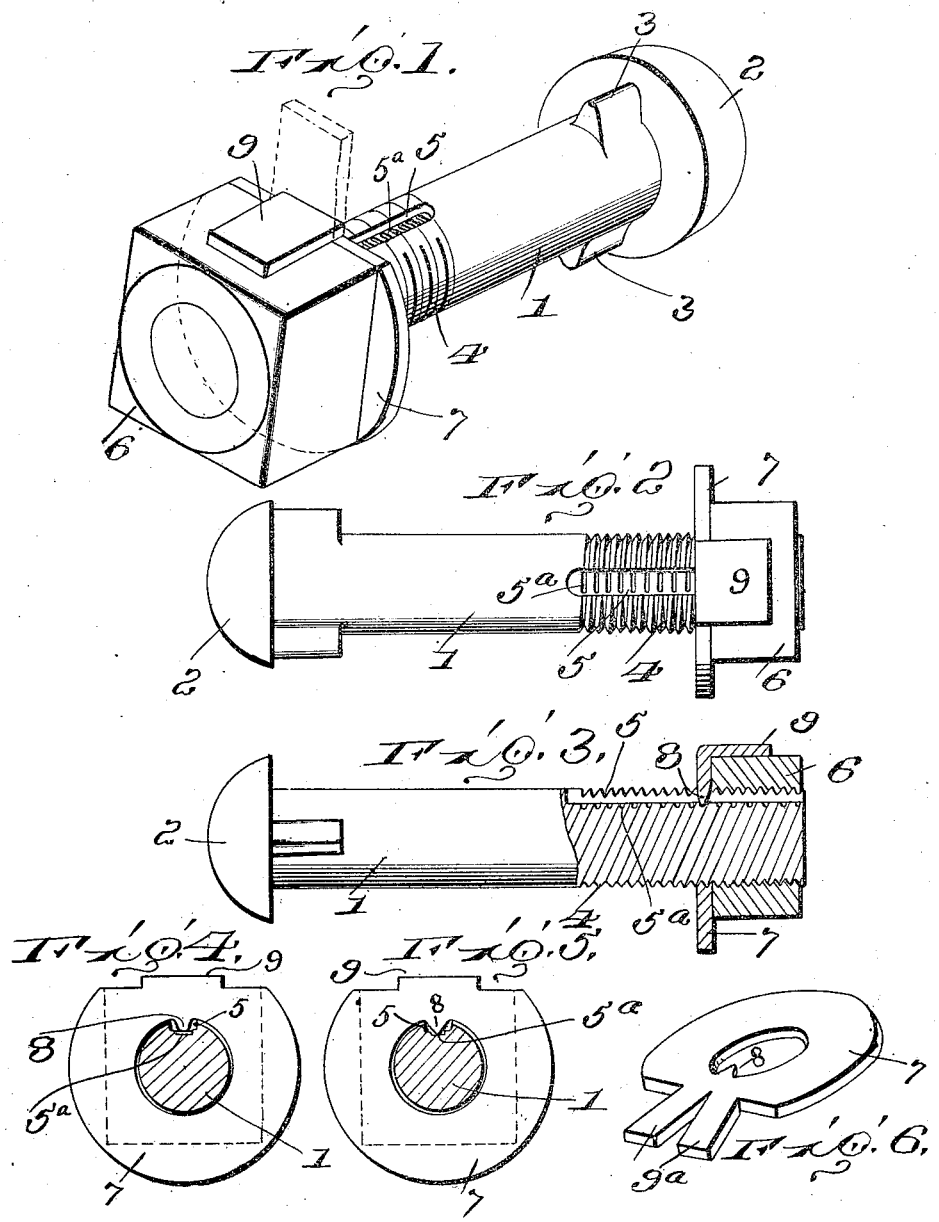

BRINKER R. JONES, OF SOMERSET, PENNSYLVANIA.

COMBINATION LOCK-NUT WASHER AND BOLT.

1,077,080.  Specification of Letters Patent.  Patented Oct. 28, 1913.

Application filed March 2, 1911. Serial No. 611,842.

*To all whom it may concern:*

Be it known that I, BRINKER R. JONES, citizen of the United States, residing at Somerset, in the county of Somerset and State of Pennsylvania, have invented certain new and useful Improvements in Combination Lock-Nut Washers and Bolts, of which the following is a specification.

This invention has for its primary object a simple and efficient construction of nut locking washer and bolt therefor, which may be easily and cheaply manufactured, and which will be capable of holding a nut securely from moving in either direction, without any direct engagement between the nut locking washer and the part through which the bolt passes.

Another object of the invention is to provide a device whereby the washer may be maintained relative to the nut independently of the object to be clamped.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a perspective view of my invention; Figs. 2 and 3 are elevations thereof, Fig. 3 being partly in section; Figs. 4 and 5 are transverse sectional views; Fig. 6 is a detail perspective view of a modification of the nut locking washer.

Corresponding and like parts are referred to in the following description and indicated in all the views of the drawings by the same reference characters.

Referring to the drawing, the numeral 1 designates a bolt which is provided at one end with any form of head 2 and which may also be provided, if desired, with the ordinary fins 3, whereby the bolt may be prevented from turning in the fish plate or other part to which it is secured.

4 designates the threaded portion of the bolt, the same being formed with a longitudinal groove 5 interrupting the threads, said groove being provided with any desired number of transversely elongated bottom depressions 5ª, as clearly illustrated in Fig. 3. 6 designates the nut.

My improved nut locking washer 7 may be of any desired thickness and size according to the work required of it, said washer being preferably circular, as shown, and provided with a nib 8 projecting into the bolt receiving opening of the washer. The washer 7 is also formed with a tongue 9 which is preferably located contiguous to the nib or lug 8, the washer being cut away, to form the tongue 9, and the latter being rectangular with parallel side edges, whereby it may be easily turned over the side of the nut 6 and lie flat against such side, as clearly illustrated in the drawing. In the practical use of this form of washer, the washer is slipped over the threaded end of the bolt, the lug 8 sliding in the groove 5, and the nut 6 is then screwed on to the required extent, whereupon the locking tongue 9 is bent down over one side of the nut. It is to be particularly noted that in hammering upon the tongue 9 over the nut, when the nut and washer are properly adjusted for this operation, the lug 8 will engage in one of the bottom depressions 5ª of the groove 5; hence, as will be readily understood, the washer 7 may be held from moving in either direction, this being a desideratum, whenever it is necessary that the washer shall not bind against or contact with the part in which the bolt is mounted as for instance when employed where considerable movement or play is desired between the nut and the object through which the bolt passes. Another object of this arrangement is that the distance to which the nut is to be turned may be accurately gaged and the washer forced to a predetermined position and the nut then turned until it engages the washer and the washer then locked to the bolt. The improved device is thus capable of being employed to advantage in many localities where the ordinary bolt and nut cannot be used without danger of the nut becoming loosened. This is an important feature of applicant's device and materially increases its efficiency and utility.

It is to be clearly understood that my invention is not limited to any particular location for the groove in the bolt or the lug and tongue of the washer, that any number of grooves, lugs and tongues may be employed, and that the lugs and grooves may be of any desired shape in so far as such changes fall within the scope of the claim. If desired, the tongue may be split as shown at 9ª in Fig. 6, whereby only a portion of the tongue may be initially used so that if such portion should break the remaining portion may be used in the emergency.

Having thus described the invention, what is claimed as new is:

In a lock nut, a bolt having a groove extending longitudinally of the threaded end and with a plurality of depressions in the bottom of the groove, a nut engaging the bolt, a washer engaging around the bolt and having a fin directed inwardly and adapted to engage in the groove and into the depressions and with an outwardly directed wing to bend over the nut after the same has been locked at a predetermined point on the bolt, said fin being adapted to yield and successively enter the depressions as the nut is rotated and to remain in the nearest depression when the nut is located at the required point upon the bolt.

In testimony whereof, I affix my signature in presence of two witnesses.

BRINKER R. JONES. [L. S.]

Witnesses:
    HERBERT JONES,
    WALTER JONES.